United States Patent
Kim (10) Patent No.: US 12,432,572 B2
(45) Date of Patent: Sep. 30, 2025

(54) NON-TRANSITORY COMPUTER READABLE STORAGE MEDIUM, PROCESSING DEVICE, AND BASE STATION DEVICE FOR DETERMINING PARAMETER WHEN BASE STATION DEVICE IS INSTALLED

(71) Applicant: RAKUTEN MOBILE, INC., Tokyo (JP)

(72) Inventor: Youngbin Kim, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 355 days.

(21) Appl. No.: 17/799,688

(22) PCT Filed: Aug. 4, 2021

(86) PCT No.: PCT/JP2021/029027
§ 371 (c)(1),
(2) Date: Aug. 15, 2022

(87) PCT Pub. No.: WO2022/044751
PCT Pub. Date: Mar. 3, 2022

(65) Prior Publication Data
US 2023/0066234 A1   Mar. 2, 2023

(30) Foreign Application Priority Data
Aug. 26, 2020   (JP) ................. 2020-142904

(51) Int. Cl.
*H04W 16/18*   (2009.01)
*H04W 16/14*   (2009.01)
*H04W 16/28*   (2009.01)

(52) U.S. Cl.
CPC ........... *H04W 16/18* (2013.01); *H04W 16/14* (2013.01); *H04W 16/28* (2013.01)

(58) Field of Classification Search
CPC .............................. H04B 7/0617; H04W 16/14
See application file for complete search history.

(56) References Cited

U.S. PATENT DOCUMENTS

| | | | |
|---|---|---|---|
| 2011/0230221 A1* | 9/2011 | Hara | H04J 11/0023 455/507 |
| 2017/0085308 A1* | 3/2017 | Sun | H04B 7/0669 |

(Continued)

OTHER PUBLICATIONS

Kim, Seungmo et al. Coexistence of 5G With the Incumbents in the 28 and 70 GHz Bands, IEEE Journal on Selected Areas in Communications, vol. 35, No. 6, Jun. 2017, pp. 1254-1268 111-V, 15pp.

*Primary Examiner* — Fabricio R Murillo Garcia
(74) *Attorney, Agent, or Firm* — HAUPTMAN HAM, LLP (57) ABSTRACT

A processing device includes an acquirer, a definition unit, and a determiner. The acquirera acquires, when a signal is transmitted from each of a plurality of base station devices while changing an azimuth angle, interference power of a signal received by a target station for each combination of a base station device and an azimuth angle. The definition unit defines an azimuth angle range in which interference power equal to or greater than a threshold is included as a restricted area. The determiner determines a direction of a center of a beam of each of the plurality of base station devices so as to prevent the center of the beam of each of the plurality of base station devices from falling within the restricted area.

7 Claims, 9 Drawing Sheets

(56) References Cited

U.S. PATENT DOCUMENTS

| | | | |
|---|---|---|---|
| 2021/0029556 A1* | 1/2021 | Wu | H01Q 19/106 |
| 2021/0100005 A1 | 4/2021 | Furuichi | |
| 2022/0146621 A1* | 5/2022 | Essling | G01S 5/16 |
| 2022/0264312 A1* | 8/2022 | Furuichi | H04B 7/0617 |

\* cited by examiner

NON-TRANSITORY COMPUTER READABLE STORAGE MEDIUM, PROCESSING DEVICE, AND BASE STATION DEVICE FOR DETERMINING PARAMETER WHEN BASE STATION DEVICE IS INSTALLED

RELATED APPLICATIONS

The present application is a National Phase of International Application No. PCT/JP2021/029027, filed Aug. 4, 2021, and claims priority based on Japanese Patent Application No. 2020-142904, filed Aug. 26, 2020.

TECHNICAL FIELD

The present invention relates to a processing technology, and more particularly, to a program, a processing device, and a base station device for determining a parameter when a base station device is installed.

BACKGROUND ART

In order for a mobile network operator to obtain a license for the 5G system, interference coordination with an existing system using the same frequency band is necessary. For example, the 3.7 GHz band and the 28 GHz band used by the 5G system are already allocated to satellite communication systems. In order to reduce interference given from a base station device of the 5G system to a communication device of an existing satellite communication system, a limitation is placed so as to prevent an electrical beam of the base station device from being directed to the existing communication device (see, for example, Non Patent Literature 1).

CITATION LIST

Non Patent Literature

[Non Patent Literature 1] S. Kim, E. Visotsky, P. Moorut, K. Bechta, A. Ghosh, and C. Dietrich, "Coexistence of 5G With the Incumbents in the 28 and 70 GHz Bands", IEEE JOURNAL ON SELECTED AREAS IN COMMUNICATIONS, JUNE 2017, VOL. 35, No. 6, pp. 1254-1268

SUMMARY OF INVENTION

Technical Problem

Interference from each base station device is added up so as to ensure protection for an existing system and to allow a mobile network operator to obtain a license for the 5G system. For example, the interference is calculated using the largest antenna pattern of the base station device. The largest antenna pattern has a largest antenna gain in each direction of all beams. The processing as disclosed in Non Patent Literature 1 causes a reduction in interference given to the existing system. However, in such processing, the direction of the electrical beam of the base station device is limited, and the terminal device located in the limited direction cannot communicate with the base station device accordingly, so that the performance of the 5G system is degraded in terms of the number of deployed base station devices and capacity.

The present invention has been made in view of such problems, and it is therefore an object of the present invention to provide a technology of suppressing a reduction in the number of base station devices installed while reducing interference to an existing system.

Solution to Problem

In order to solve the above-described problems, a program according to an aspect of the present invention is a program for determining a condition for installing each of a plurality of base station devices included in a first radio communication system, the first radio communication system using the same frequency band as and being different from a second radio communication system, the program causing a computer to execute acquiring, when a signal is transmitted from each of the plurality of base station devices while changing an azimuth angle, interference power of a signal received by a target station included in the second radio communication system for each combination of a base station device and an azimuth angle, defining an azimuth angle range in which interference power equal to or greater than a threshold is included as a restricted area, and determining a direction of a center of a beam of each of the plurality of base station devices so as to prevent the center of the beam of each of the plurality of base station devices from falling within the restricted area.

Another aspect of the present invention is a processing device. This device is a processing device for determining a condition for installing each of a plurality of base station devices included in a first radio communication system, the first radio communication system using the same frequency band as and being different from a second radio communication system, the device including an acquirer structured to acquire, when a signal is transmitted from each of the plurality of base station devices while changing an azimuth angle, interference power of a signal received by a target station included in the second radio communication system for each combination of a base station device and an azimuth angle, a definition unit structured to define, as a restricted area, an azimuth angle range in which a proportion of interference power having magnitude greater than a first a threshold is greater than a second threshold, and a determiner structured to determine a direction of a center of a beam of each of the plurality of base station devices so as to prevent the center of the beam of each of the plurality of base station devices from falling within the restricted area.

Still another aspect of the present invention is a base station device. This device includes a receiver structured to receive information, and a setter structured to set a direction of a center of a beam on the basis of the information received by the receiver.

Note that any combination of the above-described components, or an entity that results from replacing expressions of the present invention among a method, a device, a system, a computer program, a recording medium storing a computer program, and the like is also valid as an aspect of the present invention.

Advantageous Effects of Invention

According to the present invention, it is possible to suppress a reduction in the number of base station devices installed while reducing interference to an existing system.

DESCRIPTION OF EMBODIMENTS

Before describing details of the present embodiment, a brief description of the present embodiment will be given below. In order for a mobile network operator to obtain a license for the 5G system, interference coordination with an existing system using the same frequency band is necessary. For example, the 3.7 GHz band and the 28 GHz band used by the 5G system are already allocated to some satellite communication systems. An existing satellite communication system uses the 28 GHz band for uplink communications, so that a base station device of the 5G system needs to protect a space station of the satellite communication system. In order to protect the existing system, interference given to the existing system needs to be less than a value allowed for the existing system.

Specifically, before deploying a base station device, interference from the base station device to the existing system is evaluated as a worst case for the 5G system. Interference from the base station device to the existing system corresponds to interference to the space station of the satellite communication system station at 28 GHz. For example, transmit power is set to the maximum transmit power, and an antenna pattern is set to the maximum antenna pattern. Based on the evaluation result under such conditions, the base station device can be deployed in a range in which an addition value of the interference is smaller than a threshold of the existing system.

This constraint affects large-scale deployment of 5G. As disclosed in Non Patent Literature 1, an electrical beam is limited. Therefore, three radio units in one base station device are freely arranged, but the use of a beam is limited, thereby causing a decrease in coverage and capacity. In the present embodiment, instead of limiting a beam, the directions of the plurality of base station devices are limited in the same manner, thereby making the coexistence constraint with the existing system less severe. The directions of the plurality of base station devices are limited in the same manner as described above, which eliminates the need of placing a limitation on an electrical beam that degrades the performance of 5G in terms of coverage and capacity. Therefore, the number of base station devices deployed under the interference constraint is increased.

Figure 1:
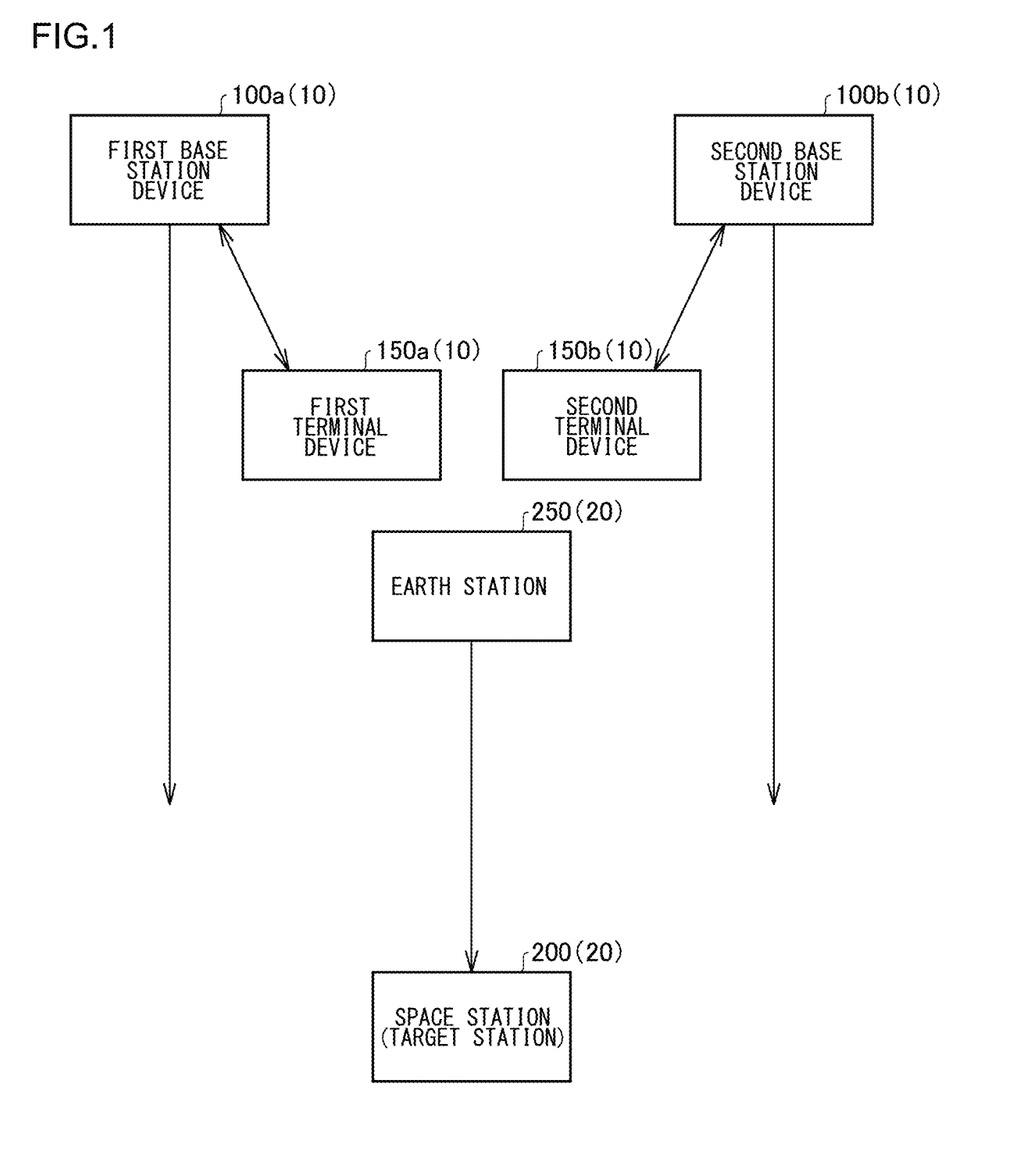
FIG. 1 is a diagram illustrating configurations of a first radio communication system and a second radio communication system according to an embodiment.

FIG. 1 illustrates configurations of a first radio communication system 10 and a second radio communication system 20. The first radio communication system 10 includes a first base station device 100a and a second base station device 100b collectively referred to as a base station device 100, and a first terminal device 150a and a second terminal device 150b collectively referred to as a terminal device 150, and the second radio communication system 20 includes a space station 200 and an Earth station 250. The number of the base station device 100 and the terminal device 150 included in the first radio communication system 10 is not limited to "2".

The first radio communication system 10 is, for example, a 5G communication system and corresponds to the above-described 5G system. Here, communications between the base station device 100 and the terminal device 150 are performed using the 28 GHz band. The second radio communication system 20 is, for example, a satellite communication system and corresponds to the above-described existing system. Here, communications from the Earth station 250 to the space station 200 are performed using the 28 GHz band. A frequency band other than the 28 GHz band may be used for communications from the space station 200 to the Earth station 250. As described above, it can be said that the first radio communication system 10 and the second radio communication system 20 are different systems using the same frequency band.

In the present embodiment, how to install a plurality of base station devices 100 under a condition where communications between the space station 200 and the Earth station 250 in the second radio communication system 20 are performed will be described. At that time, interference power received by the space station 200 from the base station device 100 needs to be less than an allowable value defined for the second radio communication system 20. The space station 200 may also be referred to as a target station.

Figure 2:
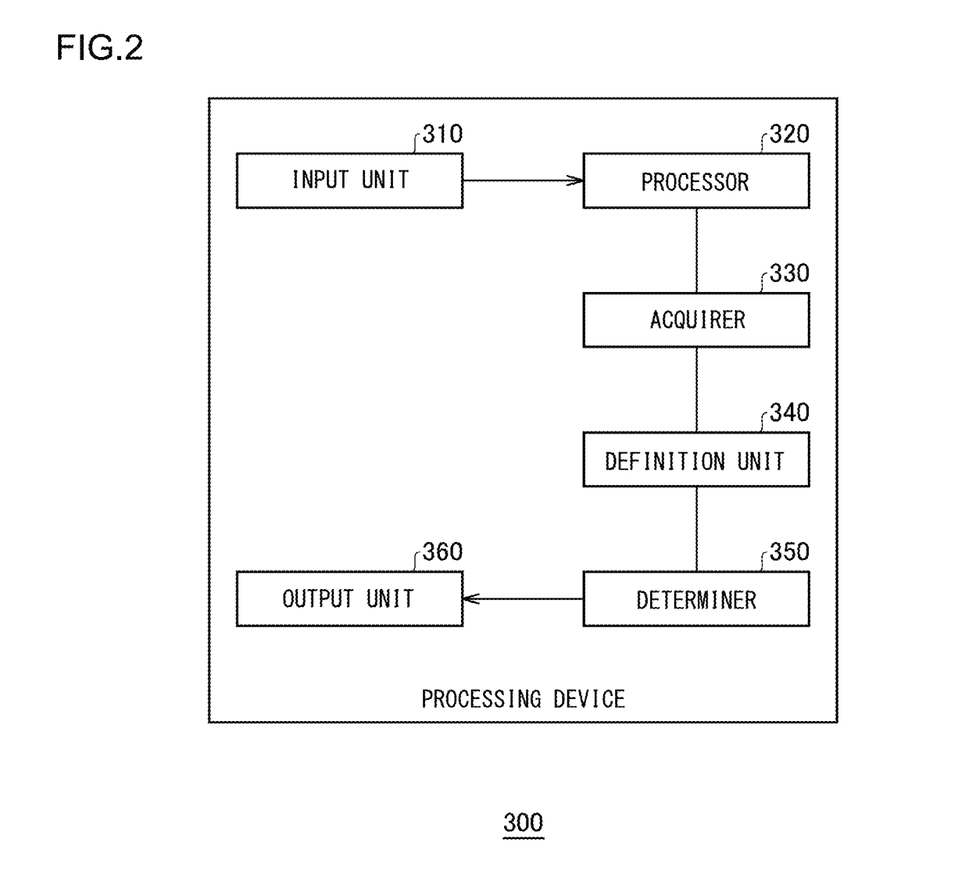
FIG. 2 is a diagram illustrating a configuration of a processing device according to the embodiment.

FIG. 2 illustrates a configuration of a processing device 300. The processing device 300 includes an input unit 310, a processor 320, an acquirer 330, a definition unit 340, a determiner 350, and an output unit 360. The processing device 300 is a computer that executes an application program for determining a condition for installing each of the plurality of base station devices 100.

The input unit 310 has an interface operated by a user, and receives position information (hereinafter, referred to as "first position information") on each of the plurality of base station devices 100 included in the first radio communication system 10 and position information (hereinafter, referred to as "second position information") on the space station 200 included in the second radio communication system 20 from the user via the interface. When a mobile network operator plans to install the plurality of base station devices 100 in Japan, information on planned installation positions is received as the first position information. Further, the second position information corresponds to position information on a geostationary satellite. The input unit 310 outputs a plurality of pieces of the first position information and the second position information to the processor 320.

The processor 320 is a communication channel simulator, and performs, for example, ray-trace simulation. The processor 320 performs the ray-trace simulation to derive, for each base station device 100, received power when a signal transmitted by each of the plurality of base station devices 100 is received by the space station 200 as interference power. At that time, simulation parameters such as transmit power for the base station device 100 are set to be compatible with the 5G communication system.

More specifically, an azimuth angle of the antenna of each base station device 100 is defined on a clockwise basis, specifically, true north is "0 degrees", true east is "90 degrees", true south is "180 degrees", and true west is "270 degrees". When the azimuth angle of each of the plurality of base station devices 100 is set to "0 degrees" and then a signal is transmitted in the direction of the azimuth angle, the processor 320 derives interference power to the space station 200 for each base station device 100. Subsequently, the processor 320 changes the azimuth angle of each of the plurality of base station devices 100 and derives interference power to the space station 200 for each base station device 100. At that time, the azimuth angles of the base station devices 100 are equal to each other. Specifically, when a signal is transmitted while changing the azimuth angles of the plurality of base station devices 100 so as to make the azimuth angles equal to each other, the processor 320 derives the interference power of the signal received by the space station 200 for each combination of the azimuth angle and the base station device 100.

Figure 3:
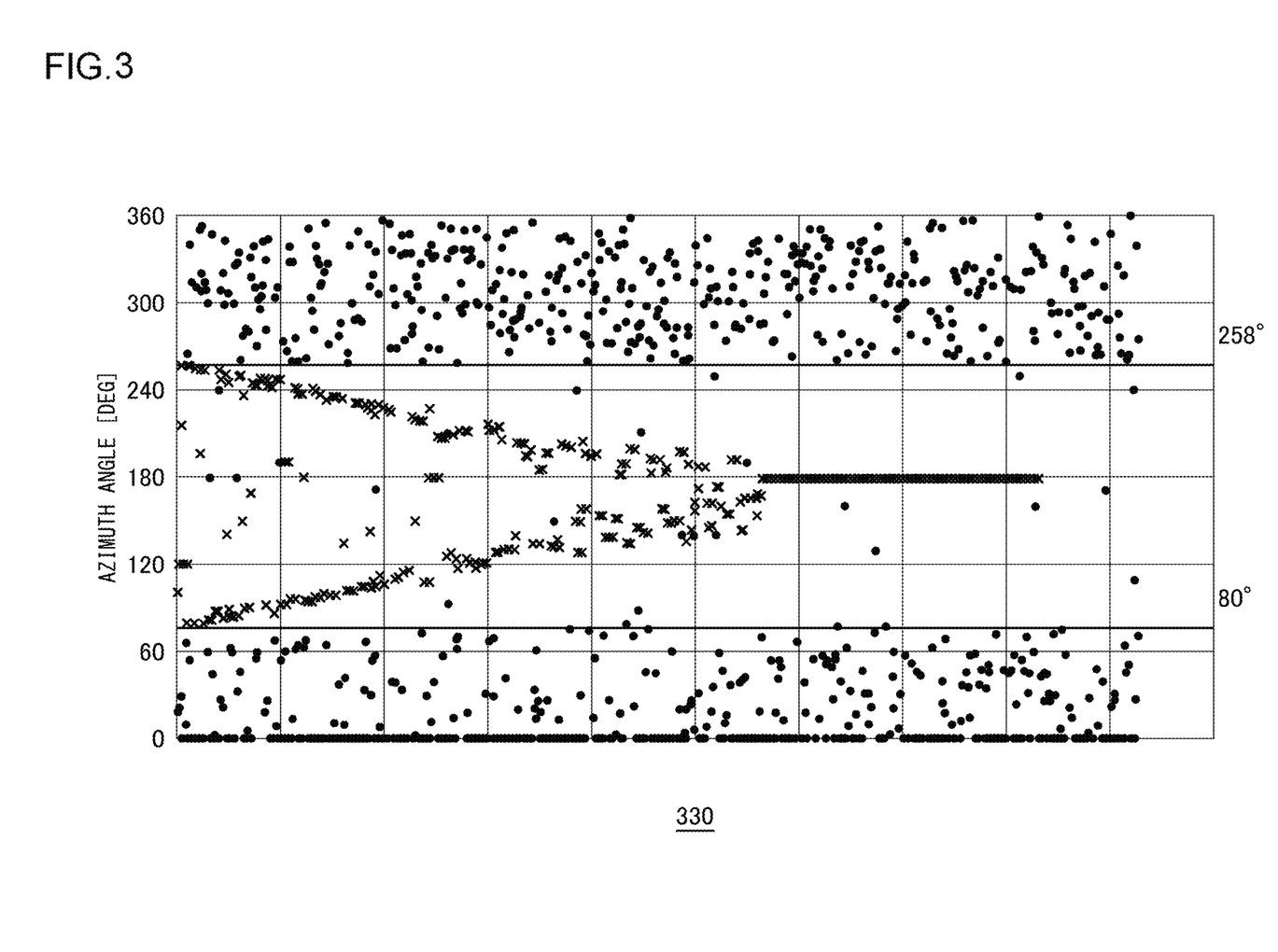
FIG. 3 is a diagram illustrating distribution of interference power with respect to an azimuth angle acquired by an acquirer illustrated in FIG. 2.

The acquirer 330 acquires a result of the ray-trace simulation performed by the processor 320. More specifically, the acquirer 330 acquires the interference power derived for each combination of the base station device 100 and the azimuth angle. FIG. 3 illustrates distribution of interference power with respect to the azimuth angle acquired by the acquirer 330. The vertical axis represents the azimuth angle [degrees]. In FIG. 3, a black circle indicates interference power of −230 dBm/MHz or less, and a cross indicates interference power of −180 dBm/MHz or more. Returning to FIG. 2.

The definition unit 340 receives the distribution illustrated in FIG. 3 from the acquirer 330. As illustrated in FIG. 3, interference from the base station device 100 to the space station 200 on a geosynchronous orbit is classified into two categories: interference power of −230 dBm/MHz or less; and interference power of −180 dBm/MHz or more. Here, the two categories are defined with no consideration given to the elevation angle of each of the plurality of base station devices 100.

Figure 4:
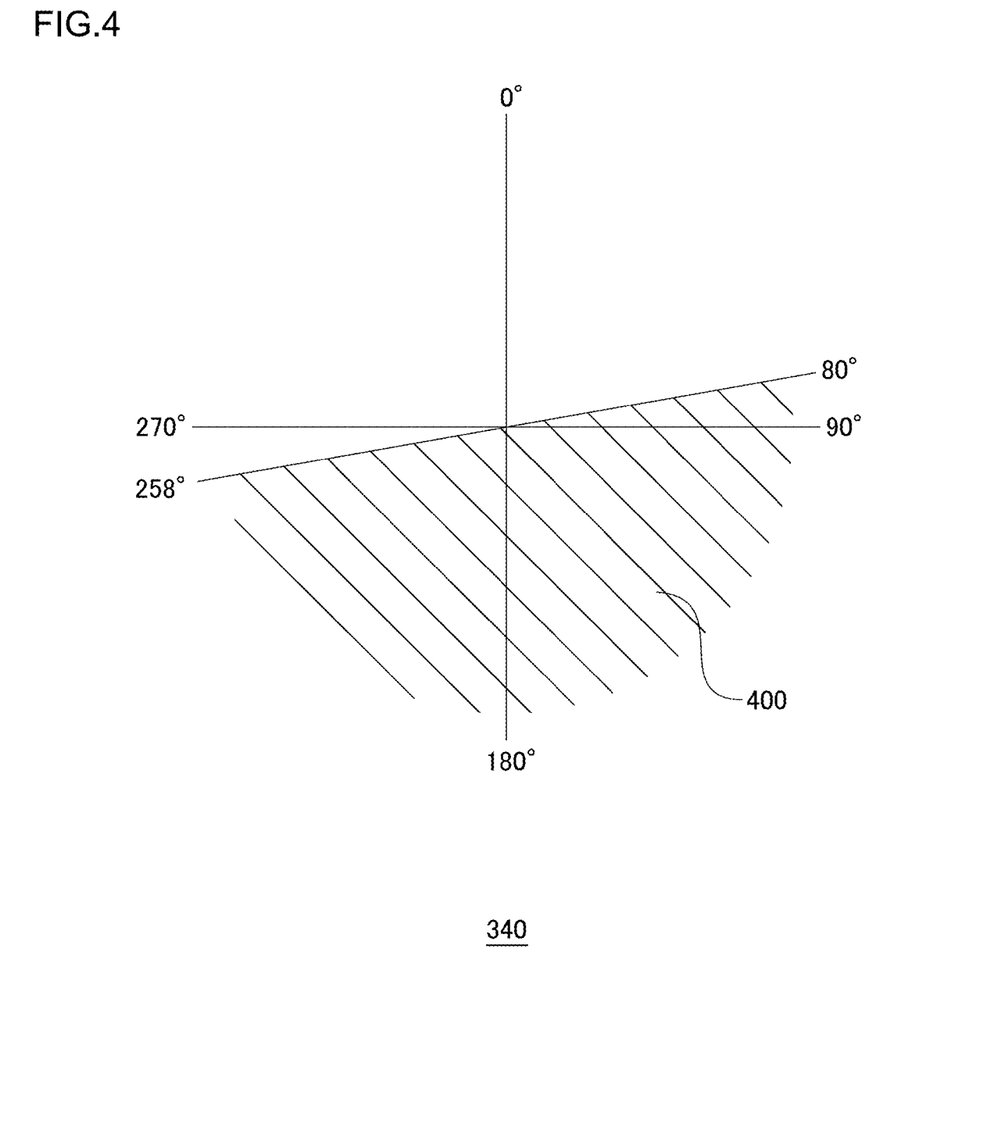
FIG. 4 is a diagram illustrating a restricted area defined by a definition unit illustrated in FIG. 2.

The definition unit 340 defines an azimuth angle range in which interference power of −180 dBm/MHz or more is included on the basis of the distribution illustrated in FIG. 3. Here, a range of 80 degrees to 258 degrees is defined. The defined range is referred to as a "restricted area". FIG. 4 illustrates a restricted area 400 defined by the definition unit 340. As described above, the azimuth angle is defined on a clockwise basis. Further, the azimuth angle range from 80 degrees to 258 degrees is defined as the restricted area 400. Here, −180 dBm/MHz is a value at which, when each of the plurality of base station devices 100 transmits a signal in the same direction, interference power to the space station 200 can be equal to or greater than the allowable value, or cumulative interference power to the space station 200 can be equal to or greater than the allowable value with a relatively small number of base station devices 100 installed. Therefore, −180 dBm/MHz may be referred to as a threshold. Further, the threshold is not limited to −180 dBm/MHz. As a result, the plurality of base station devices 100 are not deployed in the azimuth angle range of 80 degrees to 258 degrees.

The determiner 350 determines the orientations of the plurality of base station devices 100 on the basis of the restricted area 400 defined by the definition unit 340. Here, the antenna included in each base station device 100 is assumed to be a plurality of sector antennas.

Figure 5:
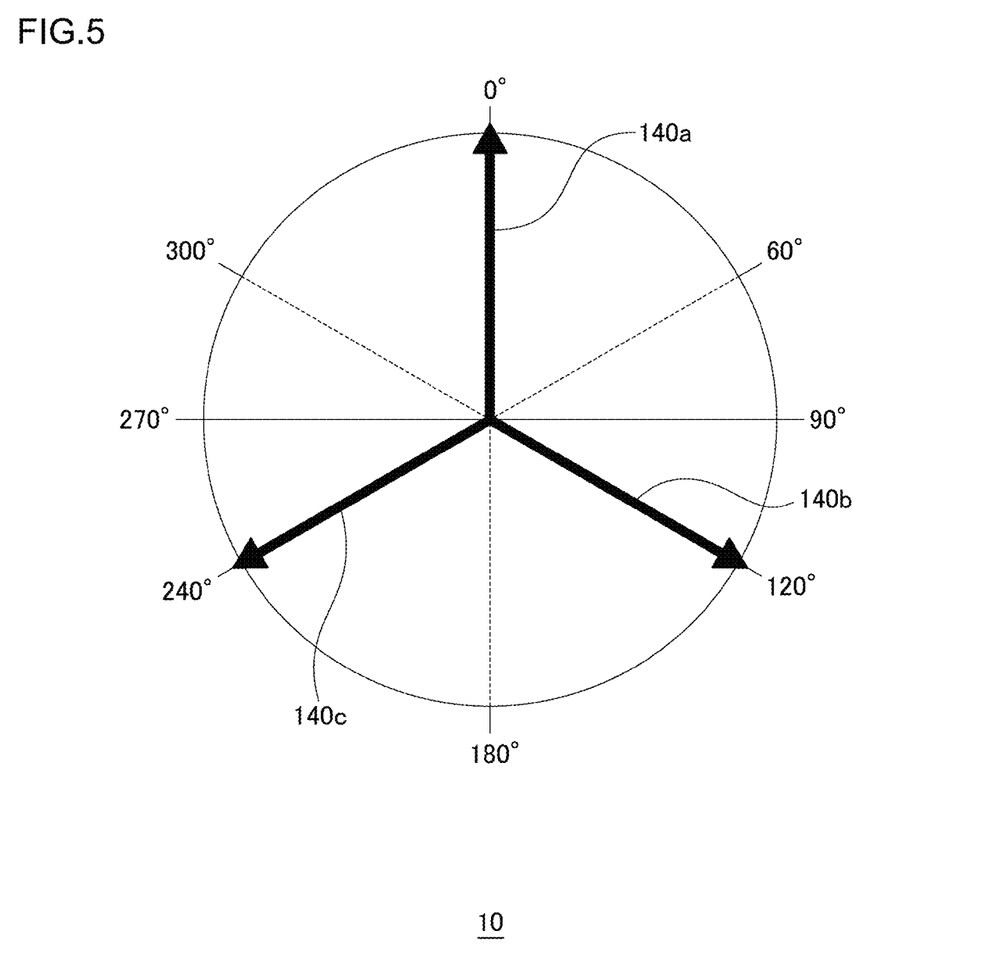
FIG. 5 is a diagram illustrating a configuration of a sector antenna of a base station device illustrated in FIG. 1.

FIG. 5 illustrates a configuration of a sector antenna 140 of base station devices 100. The azimuth angle in FIG. 5 is shown in the same manner as above. The antenna includes a first sector antenna 140a, a second sector antenna 140b, and a third sector antenna 140c collectively referred to as the sector antenna 140. The number of sector antennas 140 included in the antenna is not limited to "3". A direction of a center of a beam of the first sector antenna 140a coincides with the azimuth angle of "0 degrees", a direction of a center of a beam of the second sector antenna 140b coincides with the azimuth angle of "120 degrees", and a direction of a center of a beam of the third sector antenna 140c coincides with the azimuth angle of "180 degrees". Further, a beam width of the first sector antenna 140a coincides with the azimuth angle of "300 degrees to 60 degrees", a beam width of the second sector antenna 140b coincides with the azimuth angle of "60 degrees to 180 degrees", and a beam width of the third sector antenna 140c coincides with the azimuth angle of "180 degrees to 300 degrees". That is, the directions of the center of the beam of the sector antennas 140 have different azimuth angles, and each beam width ranges from "−60 degrees" to "+60 degrees" relative to a corresponding direction of the center of the beam. Returning to FIG. 2.

Figure 6:
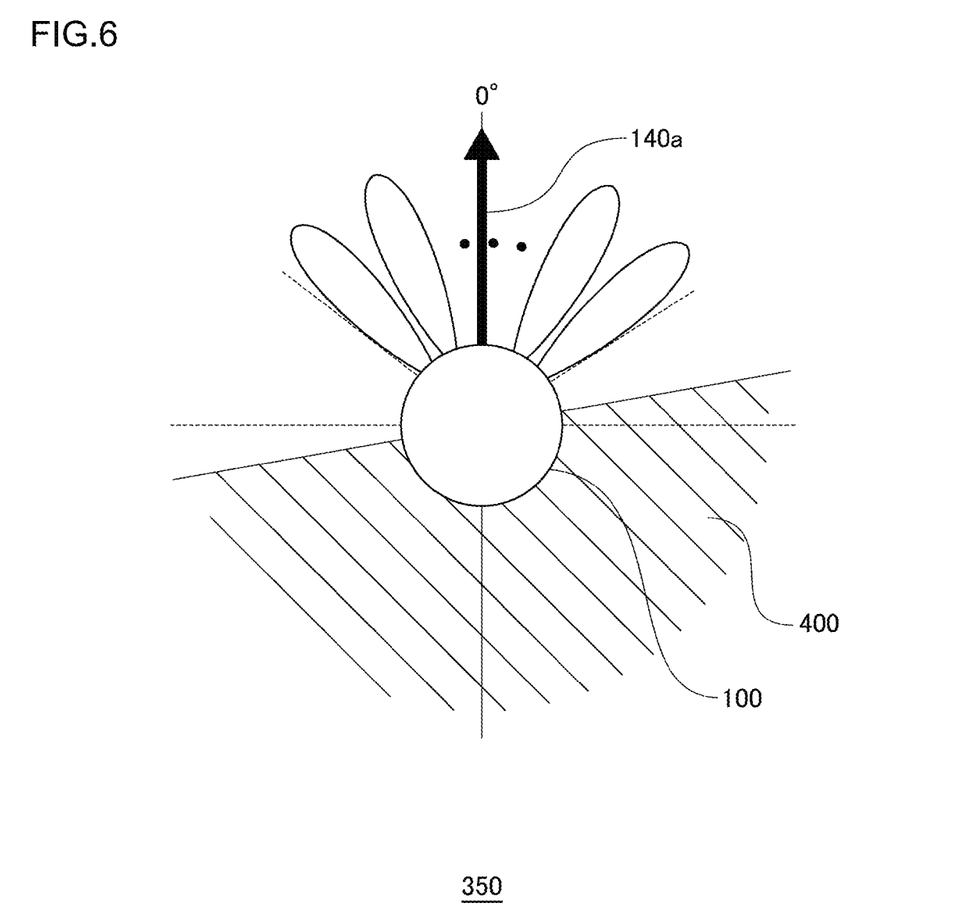
FIG. 6 is a diagram illustrating a direction of a center of a beam determined by a determiner illustrated in FIG. 2.

The determiner 350 determines the direction of the center of the beam of each of the plurality of base station devices 100 so as to prevent the center of the beam of each of the plurality of base station devices 100 from falling within the restricted area 400. FIG. 6 illustrates the direction of the center of the beam determined by the determiner 350. The restricted area 400 is illustrated in the same manner as in FIG. 4. Here, the first sector antenna 140a oriented in the direction of "0 degrees" that is an azimuth angle outside the range of 80 degrees to 258 degrees of the restricted area 400 is selected. That is, the determiner 350 selects the sector antenna 140 from which the center of the beam is not directed to the restricted area 400.

As described above, determining the direction of the center of the beam of each of the plurality of base station devices 100 so as to prevent the direction from falling within the restricted area 400, that is, limiting the azimuth angle of the base station device 100 makes the interference to the space station 200 smaller. The beam of each base station device 100, however, can be used, without limitation, within the sector of the base station device 100. This allows an increase in the number of base station devices 100 that can be deployed.

Figure 7:
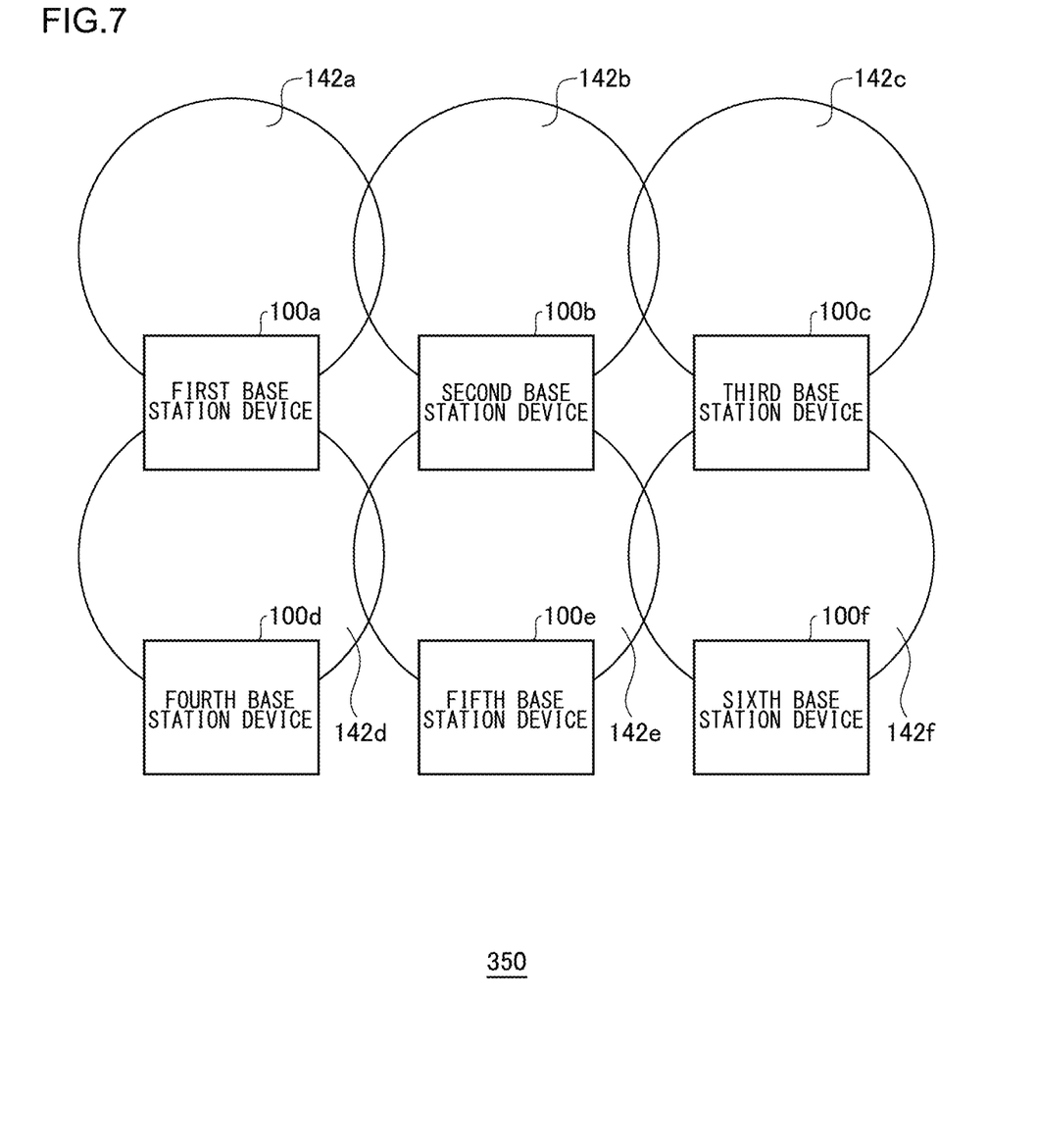
FIG. 7 is a diagram illustrating an arrangement of base station devices determined by the determiner illustrated in FIG. 2.

The determiner 350 may determine a position where each of the plurality of base station devices 100 is installed. FIG. 7 illustrates an arrangement of the base station devices 100 determined by the determiner 350. Here, as an example, the first base station device 100a to a sixth base station device 100f are illustrated. For each base station device 100, the first sector antenna 140a is selected. When the first sector antenna 140a is selected, the first base station device 100a forms a first communication-enabled area 142a, the second base station device 100b forms a second communication-enabled area 142b, . . . , and the sixth base station device 100f forms a sixth communication-enabled area 142f. The first communication-enabled area 142a to the sixth communication-enabled area 142f are collectively referred to as a communication-enabled area 142. The communication-enabled area 142 is an area where communications with the base station device 100 can be performed, and is an area covered by the beam of the base station device 100. For example, the second communication-enabled area 142b is formed in the direction of the azimuth angle of "0 degrees" from the second base station device 100b. The second communication-enabled area 142b does not cover the directions of the azimuth angles of "90 degrees", "180 degrees", and "270 degrees" from the second base station device 100b.

In order to cover the direction of the azimuth angle "180 degrees" from the second base station device 100b that is not covered by the second communication-enabled area 142b, the fifth base station device 100e is installed in the direction of the azimuth angle of "180 degrees" from the second base station device 100b. The fifth base station device 100e is oriented in the direction of the same azimuth angle as the second base station device 100b, so that the direction of the azimuth angle of "180 degrees" from the second base station device 100b is covered by the fifth communication-enabled area 142e.

In order to cover the direction of the azimuth angle "270 degrees" from the second base station device 100b that is not covered by the second communication-enabled area 142b, the first base station device 100a is installed in the direction of the azimuth angle of "270 degrees" from the second base station device 100b, and the fourth base station device 100d is installed in the direction of the azimuth angle of "270 degrees" from the fifth base station device 100e. A relative positional relationship between the first base station device 100a and the fourth base station device 100d is the same as a relative positional relationship between the second base station device 100b and the fifth base station device 100e. The first base station device 100a and the fourth base station device 100d are oriented in the direction of the same azimuth angle as the second base station device 100b, so that the direction of the azimuth angle "270 degrees" from the second base station device 100b is covered by the first communication-enabled area 142a and the fourth communication-enabled area 142d.

In order to cover the direction of the azimuth angle "90 degrees" from the second base station device 100b that is not covered by the second communication-enabled area 142b, the third base station device 100c is installed in the direction of the azimuth angle of "90 degrees" from the second base station device 100b, and the sixth base station device 100f is installed in the direction of the azimuth angle of "90 degrees" from the fifth base station device 100e. A relative positional relationship between the third base station device 100c and the sixth base station device 100f is the same as the relative positional relationship between the second base station device 100b and the fifth base station device 100e. The third base station device 100c and the sixth base station device 100f are oriented in the direction of the same azimuth angle as the second base station device 100b, the direction of the azimuth angle "90 degrees" from the second base station device 100b is covered by the third communication-enabled area 142c and the sixth communication-enabled area 142f. That is, another base station device 100 is installed so as to cause an area that is not covered by one base station device 100 to be covered by a communication-enabled area 142 formed by another base station device 100.

The output unit 360 outputs information on the direction of the center of the beam determined by the determiner 350 and information on the arrangement of the base station devices 100. The output is displayed on a monitor or transmitted as electronic data. Further, when the output unit 360 is connected to each base station device 100 over a network (not illustrated), the output unit 360 may transmit the information on the direction of the center of the beam determined by the determiner 350 to each base station device 100.

This configuration is implemented, in terms of hardware, by a central processing unit (CPU), a memory, and other large scale integration (LSI) of any desired computer and implemented, in terms of software, by a program loaded on the memory and the like, but herein, functional blocks implemented by cooperation between the hardware and the software are illustrated. Therefore, it is to be understood by those skilled in the art that these functional blocks can be implemented in various forms such as hardware only or a combination of hardware and software.

Figure 8:
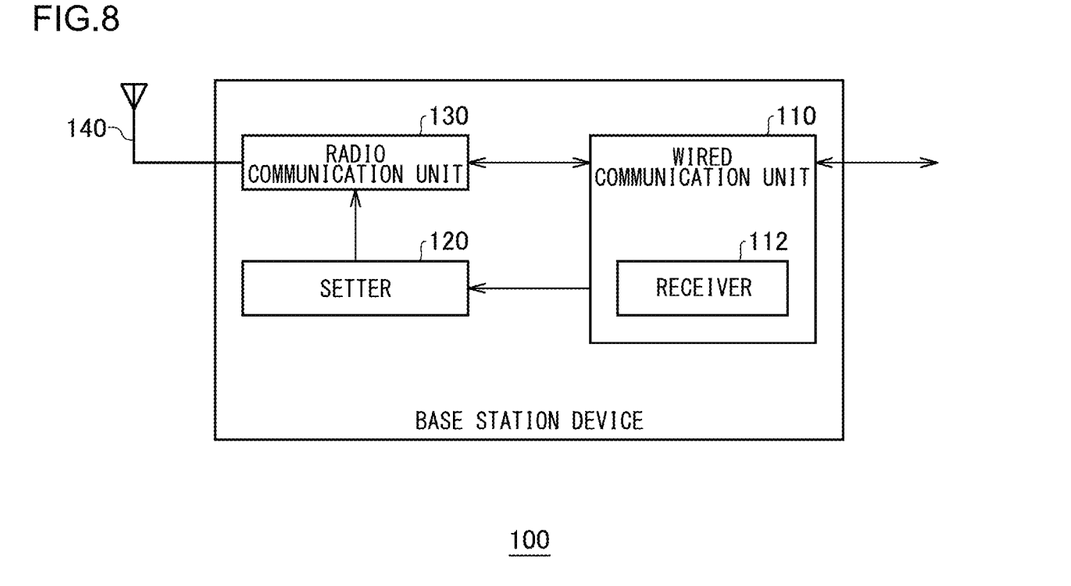
FIG. 8 is a diagram illustrating a configuration of the base station device illustrated in FIG. 1.

FIG. 8 illustrates a configuration of the base station device 100. The base station device 100 includes a wired communication unit 110, a setter 120, a radio communication unit 130, and the sector antenna 140. The wired communication unit 110 is connected to a network (not illustrated), and performs communications with a core network including a router and a server or with another base station device 100 over the network. A receiver 112 of the wired communication unit 110 receives information from the processing device 300.

The setter 120 sets the direction of the center of the beam of the sector antenna 140 on the basis of the information received by the receiver 112. The radio communication unit 130 performs communications with the terminal device 150 illustrated in FIG. 1 using the sector antenna 140 having the direction of the center of the beam set by the setter 120. Any publicly known technology may be applied to the wired communication unit 110 and the radio communication unit 130, and thus, no description will be given below of the wired communication unit 110 and the radio communication unit 130.

This configuration is implemented, in terms of hardware, by a central processing unit (CPU), a memory, and other large scale integration (LSI) of any desired computer and implemented, in terms of software, by a program loaded on the memory and the like, but herein, functional blocks implemented by cooperation between the hardware and the software are illustrated. Therefore, it is to be understood by those skilled in the art that these functional blocks can be implemented in various forms such as hardware only or a combination of hardware and software.

Figure 9:
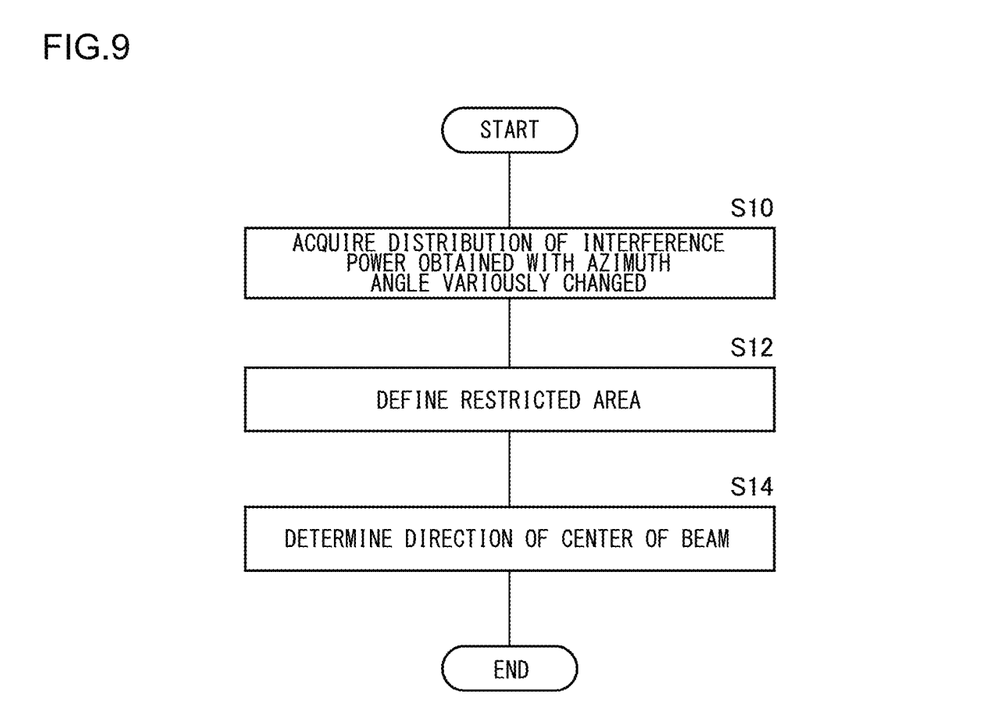
FIG. 9 is a flowchart illustrating a determination procedure performed by the processing device illustrated in FIG. 2.

The operation of the processing device 300 having the above configuration will be described. FIG. 9 is a flowchart illustrating a determination procedure performed by the processing device 300. The acquirer 330 acquires the distribution of interference power obtained with the azimuth angle variously changed (S10). The definition unit 340 defines the restricted area 400 on the basis of the distribution of interference power (S12). The determiner 350 determines the direction of the center of the beam (S14).

According to the present embodiment, the azimuth angle range in which interference power equal to or greater than the threshold is included is defined as the restricted area, and the direction of the center of the beam of each of the plurality of base station devices is determined so as not to fall within the restricted area, thereby allowing a reduction in interference to the space station. Further, since the interference to the space station is reduced, it is possible to suppress a reduction in the number of base station devices installed. Further, since a reduction in the number of base station devices is suppressed, installation of base station devices can be expanded. Further, since the beam is not limited, it is possible to suppress a decrease in coverage and capacity.

Further, since the sector antenna from which the center of the beam is not directed to the restricted area is selected, the processing can be simplified. Further, since the position where each of the plurality of base station devices is installed is also determined, it is possible to suppress a decrease in the area covered by the plurality of base station devices. Further, since the information on the determined direction of the center of the beam is output, it is possible to use the information on the determined direction of the center of the beam. Further, since the direction of the center of the beam is set on the basis of the information received from the processing device, it is possible to set the direction of the center of the beam so as to make the interference to the space station smaller.

The present disclosure has been described on the basis of the embodiment. It is to be understood by those skilled in the art that the embodiment is illustrative and that various modifications are possible for a combination of components or processes, and that such modifications are also within the scope of the present disclosure.

The base station device 100 according to the present embodiment includes the plurality of sector antennas 140. However, not only such a configuration, but also a configuration where, for example, the base station device 100 includes a single sector antenna 140 that is rotatable on a horizontal plane so as to make the azimuth angle variable may be employed. The sector antenna 140 is oriented in the direction determined by the determiner 350. This modification allows an increase in the degree of freedom of the configuration.

In the present embodiment, it is assumed that the satellite communication system is already installed as the second radio communication system 20. However, the present embodiment may be practiced under not only such a condition, but also a condition where, for example, another satellite communication system different from the second radio communication system 20 is already installed as a third radio communication system. The third radio communication system uses the same frequency band as the first radio communication system 10 and the second radio communication system 20. Here, the space station 200 included in the second radio communication system 20 is referred to as a "second space station (second target station)", and the restricted area 400 set for the second radio communication system 20 is referred to as a "second restricted area". Further, a space station included in the third radio communication system is referred to as a "third space station (third target station)", and a restricted area set for the third radio communication system is referred to as a "third restricted area".

The processor 320, the acquirer 330, and the definition unit 340 perform processing the same as described above on the third space station of the third radio communication system, thereby defining, as the third restricted area, an azimuth angle range in which interference power equal to or greater than the threshold out of interference power to the third space station is included. The definition unit 340 derives a total restricted area by combining the second restricted area and the third restricted area. For example, the total restricted area is derived by adding up the azimuth angle range of the second restricted area and the azimuth angle range of a third restricted area. When the second restricted area is in the range of 80 degrees to 258 degrees and the third restricted area is in the range of 10 degrees to 230 degrees, the total restricted area is in the range of 10 degrees to 258 degrees.

Further, the total restricted area may be derived from an overlapping portion between the azimuth angle range of the second restricted area and the azimuth angle range of the third restricted area. When the second restricted area has a range of 80 degrees to 258 degrees, and the third restricted area has a range of 10 degrees to 230 degrees, the total restricted area has a range of 80 degrees to 230 degrees. The determiner 350 makes a determination so as to prevent the center of the beam of each of the plurality of base station devices 100 from falling within the total restricted area. This modification allows an increase in the degree of freedom of the configuration.

INDUSTRIAL APPLICABILITY

According to the present invention, it is possible to suppress a reduction in the number of base station devices installed while reducing interference to an existing system.

The invention claimed is:

1. A non-transitory computer readable storage medium encoded with a program, the program comprising modules implemented by a computer adapted to determine a condition for installing each of a plurality of base station devices included in a first radio communication system, the first radio communication system using a same frequency band as and being different from a second radio communication system, the modules including:

acquiring, when a signal is transmitted from each of the plurality of base station devices while changing an azimuth angle, interference power of the signal received by a target station included in the second radio communication system for each combination of a base station device and the azimuth angle;

defining an azimuth angle range in which the interference power equal to or greater than a threshold is included as a restricted area; and determining a direction of a center of a beam of each of the plurality of base station devices so as to prevent the center of the beam of each of the plurality of base station devices from falling within the restricted area, wherein the direction of the center of the beam of each of the plurality of base station devices identical is identical to each other.

2. The program according to claim 1, wherein each of the plurality of base station devices includes a plurality of sector antennas, and the determining the direction of the center of the beam includes selecting a sector antenna from which the center of the beam is not directed to the restricted area.

3. The non-transitory computer readable storage medium according to claim 1, wherein the determining the direction of the center of the beam further includes determining a position where each of the plurality of base station devices is installed.

4. The non-transitory computer readable storage medium according to claim 1, wherein a third radio communication system that uses the same frequency band as the first radio communication system and the second radio communication system is present, and when the target station included in the second radio communication system is referred to as a second target station, and a second restricted area is set for the second radio communication system, a third target station is included in the third radio communication system, and a third restricted area is set for the third radio communication system, the program further comprising:

acquiring, when the signal is transmitted from each of the plurality of base station devices while changing the azimuth angle, the interference power of the signal received by the third target station for each combination of the base station device and the azimuth angle;

defining the azimuth angle range in which the interference power equal to or greater than the threshold out of the interference power to the third target station is included as the third restricted area; and deriving a total restricted area by combining the second restricted area and the third restricted area, wherein in the determining the direction of the center of the beam, the center of the beam of each of the plurality of base station devices is prevented from falling within the total restricted area.

5. A processing device for determining a condition for installing each of a plurality of base station devices included in a first radio communication system, the first radio communication system using a same frequency band as and being different from a second radio communication system, the processing device comprising:

an acquirer structured to acquire, when a signal is transmitted from each of the plurality of base station devices while changing an azimuth angle, interference power of the signal received by a target station included in the second radio communication system for each combination of a base station device and the azimuth angle;

a definition unit structured to define an azimuth angle range in which the interference power equal to or greater than a threshold is included as a restricted area; and a determiner structured to determine a direction of a center of a beam of each of the plurality of base station devices so as to prevent the center of the beam of each of the plurality of base station devices from falling within the restricted area, wherein the direction of the center of the beam of each of the plurality of base station devices is identical to each other by transmitting the beam of each of the plurality of base stations in a same direction.

6. The processing device according to claim 5, further comprising an output unit structured to output information on the direction of the center of the beam determined by the determiner.

7. A base station device comprising:

a processing device for determining a condition for installing each of a plurality of base station devices included in a first radio communication system, the first radio communication system using a same frequency band as and being different from a second radio communication system, wherein the processing device comprises:

an acquirer structured to acquire, when a signal is transmitted from each of the plurality of base station devices while changing an azimuth angle, interference power of the signal received by a target station included in the second radio communication system for each combination of a base station device and the azimuth angle;

a definition unit structured to define an azimuth angle range in which the interference power equal to or greater than a threshold is included as a restricted area; and a determiner structured to determine a direction of a center of a beam of each of the plurality of base station devices so as to prevent the center of the beam of each of the plurality of base station devices from falling within the restricted area; and an output unit structured to output information on the direction of the center of the beam determined by the determiner, a receiver structured to receive information from the processing device; and a setter structured to set a direction of a center of a beam on the basis of the information received by the receiver, wherein the direction of the center of the beam of each of the plurality of base station devices is identical to each other by transmitting the beam of each of the plurality of base stations in a same direction.

\* \* \* \* \*